3,405,138
O-SUBSTITUTED BENZODIOXYL OXIMES
Claude I. Judd, Mequon, Wis., assignor to Colgate-Palmolive Company, New York, N.Y., a corporation of Delaware
No Drawing. Filed July 19, 1965, Ser. No. 473,208
12 Claims. (Cl. 260—340.3)

ABSTRACT OF THE DISCLOSURE

The compounds are novel O-substituted benzodioxyl oximes which are useful as skeletal muscle relaxant agents. A compound disclosed is 2-acetyl-1,4-benzodioxane O-methyloxime.

The present invention relates to novel derivatives of 1,4-benzodioxane and processes of preparing the same. More particularly, it relates to O-substituted benzodioxyl oximes, processes of producing such compounds and pharmaceutical uses thereof.

The compounds of the present invention may be represented by the following formula:

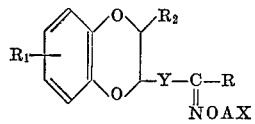

wherein Y is a chemical bond or a straight or branched chain lower alkylene containing 1 to 4 carbon atoms, such as methylene, ethylene, isopropylene and butylene, R is hydrogen, lower alkyl, aralkyl or aryl, $R_1$ is at least one nuclear substituent selected from the group consisting of hydrogen, nitro, amino, lower alkyl, lower alkoxy, phenoxy, hydroxyl, halogen, trifluoromethyl, lower alkyl thio, phenyl-lower alkyl, lower alkenyl and lower alkynyl, $R_2$ is hydrogen, lower alkyl such as methyl or ethyl, phenyl, nuclear substituted phenyl such as halogen substituted phenyl, or an aralkyl such as a phenyl-lower alkyl including benzyl and phenethyl, A is a chemical bond or a straight or branched chain alkylene of 1 to 4 carbon atoms and X is hydrogen, lower alkenyl, aryl, hydroxyl, cyano, or tertiary or cyclic amino, but when X is hydroxyl, cyano, or amino A is an alkylene.

The compound may be produced by treating a benzodioxyl ketone with an appropriate alkoxyamine or an alkoxyamine hydrohalide. The process may be represented as follows:

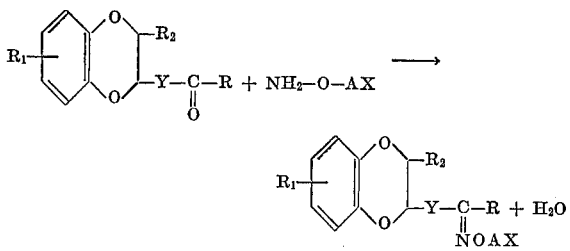

wherein all symbols are as previously described.

The above described reaction is preferably conducted by dissolving equimolar amounts of the 1,4-benzodioxyl ketone and the appropriate alkoxyamine hydrochloride in a solvent such as pyridine which also acts as an acid acceptor. The mixture is heated at reflux until the reaction is substantially complete (e.g., up to and exceeding six hours), then cooled and diluted with an excess of water. The oil which separates is extracted into a solvent such as carbon tetrachloride, the extracts washed with water and dried over magnesium sulfate. The solvent is then removed at reduced pressure and the residue distilled to yield the O-substituted oxime.

Representative of the alkoxyamines and alkoxyamine hydrohalides which may be employed in the process are the following:

methoxyamine hydrochloride,
butoxyamine,
propoxyamine hydrochloride,
allyloxyamine,
γ-hydroxypropoxyamine hydrochloride,
benzyloxyamine hydrochloride, and
γ-phenylpropoxyamine.

The compounds in which X is amino also may be produced by treating the oxime with a base to form the anion of the oxime and treating it with an appropriate aminoalkyl ester. The process may be represented as follows:

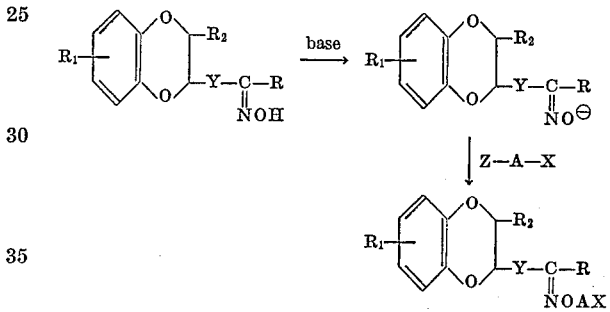

where X is amino, Z is a halogen, such as chlorine or bromine, or a tosyloxy group, A is alkylene and the other symbols are as previously described.

The above described reaction is preferably conducted by treating the oxime with a suitable base, such as sodium ethoxide, to form the oxime anion and then treating the anion with an aminoalkyl ester in a solvent, such as toluene, to form the O-substituted oxime. The reaction is promoted by the use of elevated temperatures and reflux conditions are preferred. When the reaction is substantially complete, the reaction mixture is cooled and the product isolated by conventional means such as solvent extraction.

Representative of the aminoalkyl esters which can be employed in the above process are the following:

dimethylaminoethyl tosylate,
dimethylaminoethyl chloride,
γ-dimethylaminopropyl chloride,
γ-dimethylaminopropyl bromide,
diisopropylaminoethyl chloride,
β-(4-hydroxylethyl-1-piperazinyl)ethyl bromide,
β-(N-benzyl-N-methylamino)ethyl chloride,
β-(N,N-dibenzylamino)propyl chloride,
β-(1-pyrrolidyl)ethyl chloride, and
γ-(1-piperidyl)propyl chloride.

The compounds in which X is cyano and A is alkylene may be produced by treating the oxime with an alpha,-beta unsaturated nitrile in the presence of a catalyst such as benzyltrimethyl ammonium hydroxide. The process may be represented as follows:

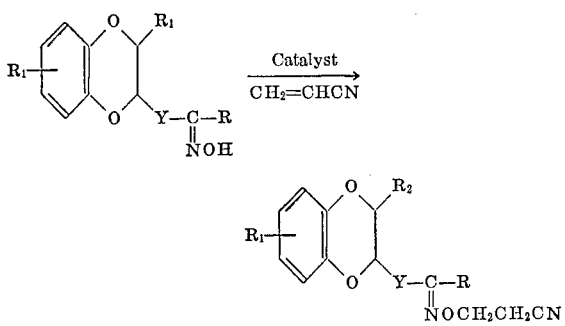

where all symbols have their assigned values.

Representative of the O-substituted benzodioxyl oximes which can be prepared by the above described processes are the following:

2-acetyl-1,4-benzodioxane O-benzyloxime,
2-acetyl-1,4-benzodioxane O-cyanoethyloxime,
2-acetyl-1,4-benzodioxane O-3-phenylpropyloxime,
2-acetyl-1,4-benzodioxane O-3-hydroxypropyloxime,
2-acetyl-1,4-benzodioxane O-alkyloxime,
2-acetyl-1,4-benzodioxane O-methyloxime,
2-formyl-1,4-benzodioxane O-methyloxime,
2-acetonyl-1,4-benzodioxane O-methyloxime,
2-benzoyl-1,4-benzodioxane O-methyloxime,
2-phenylacetyl-1,4-benzodioxane O-methyloxime,
2-acetyl-3-methyl-1,4-benzodioxane O-methyloxime,
2-propionyl-3-ethyl-1,4-benzodioxane O-methyloxime, and
O-γ-(N,N-dimethylamino)propyl 2-(1,4-benzodioxyl)-methyl ketoxime.

The preparation of the 1,4-benzodioxyl ketones and the oximes is described in detail in U.S. Patent No. 3,153,657.

The novel compounds of the present invention are potent skeletal muscle relaxants, anticonvulsants, analgesics and tranquilizers as are the oximes of which they are derivatives. However, the O-substituted oximes are superior to the corresponding oximes in that they are surprisingly less toxic than the oximes.

The toxicity of 2-acetyl-1,4-benzodioxane oxime and its O-methylated derivative were compared by administering the drugs to male ICR mice (17–25 gm.) in varied doses, observing the mortality rate, and then conducting a hematological examination of the surviving animals.

The drugs were suspended in conventional inert suspending agents and administered to the mice according to the following dosage schedule:

| Dosage (mg./kg.): | No. daily doses |
|---|---|
| 800 | 1 |
| 1000 | 1 |
| 1100 | 1 |
| 1200 | 1 |
| 1300 | 1 |
| 1400 | 1 |
| 1500 | 1 |
| 1600 | 2 |
| 1000 | 2 |

Of the ten animals which received the parent oxime, six died before completion of the test. All of the surviving mice had reticulocytosis and many Heinz bodies were observed in the blood of the animals. In addition, the red blood cells were enlarged and characterized by central achromia.

In contrast, the group of animals receiving the O-methylated oxime experienced no mortalities and only two of the mice had a slight reticulocytosis. Furthermore, no evidence of Heinz body formation was detected in the blood of any of the animals.

The compounds may be administered to animals as pure compounds. However, to obtain a more practical size to dosage relationship, one or more of the compounds is generally combined with a suitable pharmaceutical carrier and made into unit dosage forms. These dosage forms may be made for either oral or parenteral administration. However, the oral route of administration is preferred.

Phamaceutical carriers which are either liquid or solid may be employed. The preferred liquid carrier is water. However, in the event the compound is not soluble or miscible in water, an organic solvent such as propylene glycol may be employed. Flavoring materials may be included if desired.

Solid pharmaceutical carriers such as starch, sugar and talc can be utilized to form powders. These powders can be used as such or can be tableted or used to fill gelatin capsules. Suitable lubricants such as magnesium stearate, binders such as gelatin, and disintegrating agents such as sodium carbonate in combination with citric acid may be employed in the formation of the tablets.

Unit dosage forms, such as tablets and capsules, may contain any suitable predetermined safe and effective amount of one or more of the active ingredients as a non-toxic acid addition salt and may be administered one or more at a time at regular intervals. Such unit dosage forms, however, should generally contain a concentration of 0.1% to 50% by weight of one or more of the active agents. Such unit dosage forms should advisably contain about 5 to 300 mg. of the active ingredients.

A typical tablet might have the following composition:

| | Mg. |
|---|---|
| 2-acetyl-1,4-benzodioxane O-methyloxime | 10 |
| Starch, U.S.P. | 57 |
| Lactose, U.S.P. | 73 |
| Talc, U.S.P. | 9 |
| Stearic acid | 6 |

Powders (1), (2) and (3) are slugged, then granulated, mixed with (4) and (5) and tableted.

The following examples are presented to illustrate the invention:

EXAMPLE 1

2-acetyl-1,4-benzodioxane

To 145 g. (1.35 moles) of catechol in 750 cc. of 12% aqueous technical potassium hydroxide solution is added 288.9 g. (1.35 moles) of 3,4-dibromo-2-butanone. The mixture is stirred for 18 hours after which the layers are separated and the aqueous layer extracted with 3–200 cc. portions of ether. The oily layer and the ether extracts are combined and washed thoroughly with 10% sodium hydroxide solution. After washing with water and drying over anhydrous potassium carbonate, the solvent is removed under reduced pressure and the residue distilled to yield 102 g. of product, B.P. 89–90° C. (0.3 mm.).

EXAMPLE 2

2-acetyl-1,4-benzodioxane O-methyloxime

A mixture of 21.4 g. (0.12 mole) of 2-acetyl-1,4-benzodioxane, 10 g. of methoxyamine hydrochloride, and 120 ml. of pyridine is refluxed for 6 hrs., cooled and diluted with 750 ml. of water. The oil which separates is extracted into carbon tetrachloride, the organic extracts are washed with water and then dried over magnesium sulfate. Removal of the solvent at reduced pressure and distillation of the residue gives 2-acetyl 1,4-benzodioxane O-methyloxime, B.P. 70–73° (0.02 mm.).

Analysis.—Calcd. for $C_{11}H_{13}NO_3$: C, 63.75; H, 6.32; N, 6.76. Found: C, 63.72; H, 6.18; N, 6.11.

Other compounds made by the procedure of Example 2 are described in the table which follows:

TABLE 1

| AX | B.P., °C./mm. | Calculated, percent; found, percent | | |
|---|---|---|---|---|
| φ-(CH₂)₃— | 170/0.5 | 73.28 | 6.80 | 4.50 |
| | | 72.98 | 6.65 | 4.80 |
| HO(CH₂)₃— | 141-142/0.15 | 62.13 | 6.82 | 5.58 |
| | | 62.20 | 6.90 | 5.41 |
| CH₂=CH—CH₂— | 100-101/0.2 | 66.93 | 6.48 | 6.01 |
| | | 66.88 | 6.83 | 6.05 |
| φ-CH₂— | 166-168/0.9 | 72.07 | 6.05 | 4.95 |
| | | 72.26 | 6.28 | 5.20 |
| CH₃(CH₂)₃— | 94-96/0.1 | 67.42 | 7.68 | 5.62 |
| | | 67.34 | 7.42 | 5.70 |

EXAMPLE 3

2-acetyl-1,4-benzoidioxane O-β-cyanoethyloxime

To a stirred mixture of 29.0 g. (0.15 mole) of the 2-acetyl-1,4-benzodioxane omime, 180 ml. of benzene and 1.7 ml. of 40% aqueous benzyltrimethyl ammonium hydroxide, 8.8 g. (0.165 mole) of acrylonitrile is added dropwise. The mixture is stirred for 16 hrs. at 40–50°, decanted from a small amount of tarry material and the solvent evaporated. The residue is dissolved in ether, washed with 2×25 ml. water and the solution dried over magnesium sulfate. Removal of the ether gives a residue of 35.4 g. (95.6%). A 7.0 g. aliquot is distilled through a 2" column to give 2-acetyl-1,4-benzo-dioxane O-β-cyanoethyloxime in the form of a viscous oil, B.P. 140–141° (0.01 mm.).

*Analysis.*—Calcd. for $C_{13}H_{14}N_2O_3$: C, 63.41; H, 5.73; N, 11.38. Found: C, 63.58; H, 5.79; N, 11.61.

EXAMPLE 4

O-γ-(N,N-dimethylamino)propyl 2-(1,4-benzodioxyl) methly ketoxime

To a solution of 2.3 g. (0.1 mole) sodium in 100 ml. ethanol is added 19.3 g. (0.1 mole) methyl 2-(1,4-benzodioxyl) ketoxime. The alcohol is removed under reduced pressure and replaced with dry toluene. The resulting suspension is stirred and 14.6 g. (0.12 mole) freshly distilled γ-dimethylaminopropyl chloride in 125 ml. dry toluene is added and the mixture stirred at reflux for sixteen hours. The solids are removed by filtration and the filtrates evaporated and the residues distilled under reduced pressure yielding O-γ-(N,N-dimethylamino) propyl 2-(1,4-benzodioxyl) methyl ketoxime, B.P. 123–128° at 0.03 mm.

*Analysis.*—Calcd. for $C_{15}H_{22}N_2O_3$: N, 10.07. Found: N, 9.24.

The fumarate salt is prepared and has a M.P. of 127–129°.

*Analysis.*—Calcd. for $C_{18}H_{26}N_2O_7$: C, 57.86; H, 6.64; N, 3.55. Found: C, 57.82; H, 6.81; N, 3.62.

I claim:
1. A compound of the formula

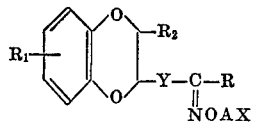

wherein Y is a chemical bond or an alkylene of 1 to 4 carbon atoms, R is lower alkyl, R₁ is at least one nuclear substituent selected from hydrogen, nitro, amino, lower alkyl, lower alkoxy, phenoxy, hydroxyl, halogen, trifluoromethyl, lower alkyl-thio, phenyl-lower alkyl, lower alkenyl and lower alkynyl, R₂ is hydrogen, lower alkyl or phenyl, A is an alkylene of 1 to 4 carbon atoms and X is hydrogen, hydroxyl, allyl, phenyl, phenyl-lower alkyl, cyano, N,N-dilower alkyl amino, N,N-dibenzyl amino, and N-benzyl-N-lower alkyl amino.

2. 2-acetyl-1,4-benzodioxane O-lower alkyloxime.
3. 2-acetyl 1,4-benzodioxane O-methyloxime.
4. 2-acetyl-1,4-benzodioxane O-cyanomethyloxime.
5. 2-acetyl-1,4-benzodioxane O-3-phenylpropyloxime.
6. 2-acetyl-1,4-benzodioxane O-3-hydroxypropyloxime.
7. 2-acetyl-1,4-benzodioxane O-allyloxime.
8. 2-acetyl-1,4-benzodioxane O-benzyloxime.
9. 2-acetyl-1,4-benzodioxane O-butyloxime.
10. O - γ - (N,N - dimethylamino)propyl - 2 - (1,4-benzodioxyl)methyl ketoxime.
11. A compound of the formula

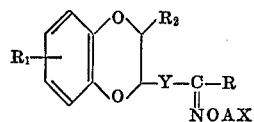

wherein Y is a chemical bond, R is lower alkyl, R₁ is hydrogen, R₂ is lower alkyl, A is methylene and X is hydrogen.

12. A compound of the formula wherein Y is a chemical bond, R is lower alkyl, R₁ and R₂ are hydrogen, A is lower alkylene and X is hydrogen.

References Cited

UNITED STATES PATENTS 3,153,657  10/1964  Judd et al. _____ 260—340.3

NICHOLAS S. RIZZO, *Primary Examiner.*

J. H. TURNIPSEED, *Assistant Examiner.*